Aug. 7, 1962

E. M. BRADLEY 3,048,829

MAGNETIC DATA STORAGE DEVICES

Filed Nov. 17, 1959

INVENTOR
EDWARD MICHAEL BRADLEY
BY Haune and Nydick
ATTORNEYS 3,048,829
Patented Aug. 7, 1962

3,048,829

MAGNETIC DATA STORAGE DEVICES

Edward Michael Bradley, Stevenage, England, assignor to International Computers and Tabulators Limited Filed Nov. 17, 1959, Ser. No. 853,520
Claims priority, application Great Britain Dec. 24, 1958
8 Claims. (Cl. 340—174)

Figures 1, 3:
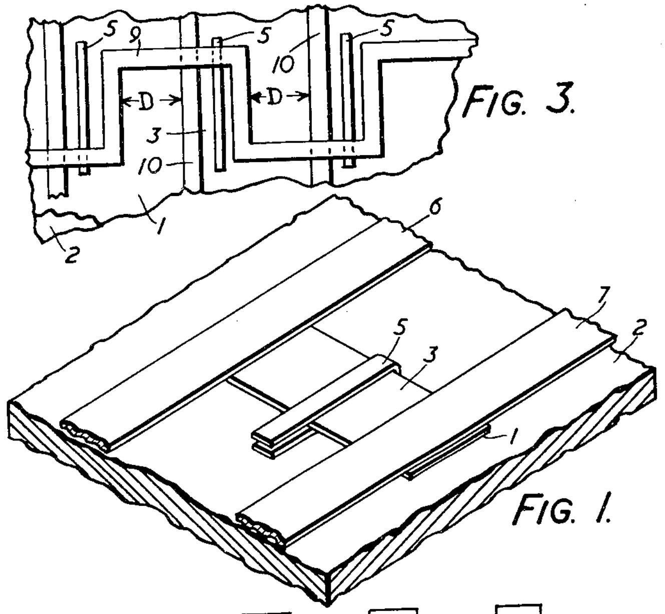

This invention relates to bistable devices using ferromagnetic films.

Devices employing ferromagnetic films have been proposed and such devices may consist of discrete areas of film deposited on a substrate, for example, glass. These films consist of planar areas of magnetic material having two opposite states of magnetic saturation, an area being sufficiently thin so that it can be switched to either of these magnetic states by the application of current to a conductor lying in a plane parallel to the plane of the area. Films of this kind will be referred to in the following description as "thin ferromagnetic films" and they may be deposited on the substrate by a vacuum evaporation technique such as that described by M. S. Blois in "The Journal of Applied Physics," volume 26, No. 8. The conductors may also be deposited by vacuum evaporation or they may be formed by one of the methods known generally in the art of printed circuit manufacture. If the ferromagnetic material is an electrical conductor an insulating layer is interposed between the film and conductor. Such an insulating layer may conveniently be formed by vacuum evaporation and a suitable material for this purpose is magnesium fluoride.

Prior devices have employed bistable ferromagnetic films as storage elements, and the films in this case are of material having a substantially rectangular hysteresis characteristic, drive conductors being so placed relative to the film that substantially the whole of the film is switched to a uniform state of magnetic saturation. A plurality of such storage elements arranged in a storage matrix may be selected by conventional half current techniques.

It is an object of the invention to provide an improved device in which an area of bistable thin ferromagnetic film is switched to one or the other of its stable states under control of the magnetic states of one or more adjacent areas of ferromagnetic film.

It is another object of the invention to provide a bistable device particularly but not exclusively for use as a storage element having a greater tolerance on drive currents than is obtainable with half current selection.

It is a further object of the invention to provide a multi-element storage device in which relatively thick magnetic films may be employed to provide a larger output voltage.

According to one aspect of the present invention a bistable device using thin ferromagnetic films includes an area of bistable magnetic film, means for switching the area from one to the other of its stable states comprising first and second other areas of ferromagnetic film adjacent to said bistable area, means for each of the said other areas arranged to produce a first or second magnetic state in that area, the said other areas being effective when they are both in the same magnetic state to switch the bistable area to a corresponding one of its bistable states and means for detecting the state of the said bistable area.

According to another aspect of the invention the bistable device comprises an inner area of thin ferromagnetic film having two stable magnetic states, first and second outer areas of thin ferromagnetic film having two magnetic states of saturation disposed adjacent to opposite edges of the bistable area, each of the areas being initially in one predetermined magnetic state, means for switching each outer area from the one to the opposite magnetic state, the bistable area being switched to the opposite stable state only by the switching of both first and second outer areas to the opposite magnetic state and remaining in the said one state if only one of the outer areas is switched to the opposite state and means for detecting the switching of the bistable area.

The switching means may include means for applying a switching current to conductors linked with the first and second areas and the detecting means may include a conductor linked with the bistable area. A plurality of bistable devices may be deposited on a common substrate and may be discrete areas of a continuous film or may each comprise separate areas of film. Such devices are particularly but not exclusively suitable for use in electronic data processing apparatus as logical switching elements or as information storage elements and in the latter case a plurality of elements may be arranged in matrix formation.

Figure 2:
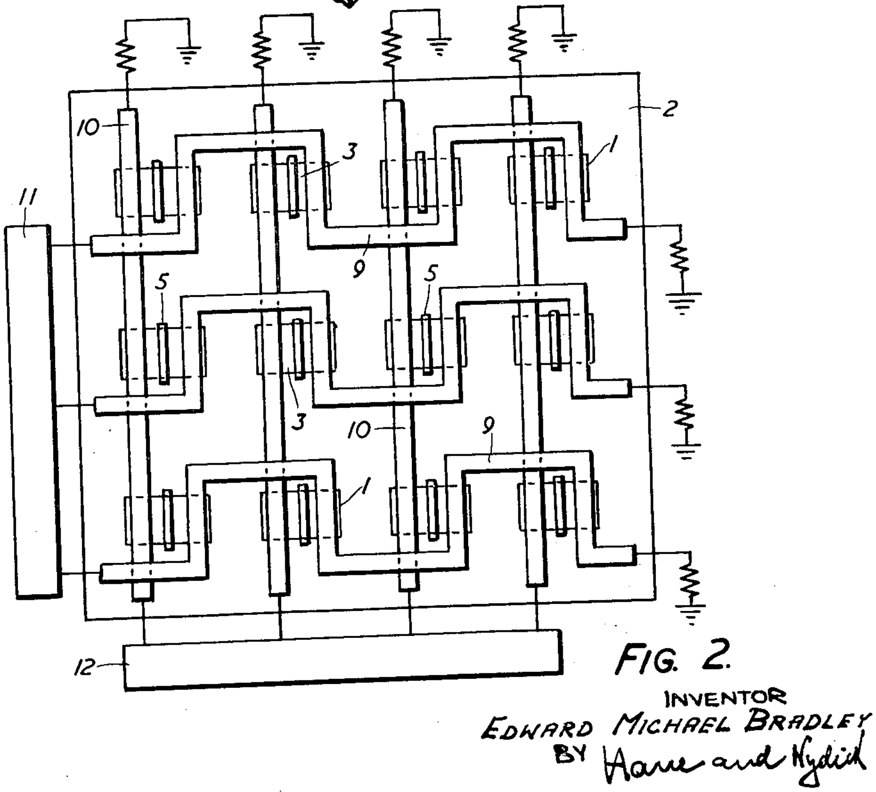

The invention will now be described, by way of example, with reference to the accompanying drawing, in which:

FIGURE 1 is a perspective view of a bistable device arranged as a storage element showing drive and pick-up conductors, FIGURE 2 is a schematic layout of the conductors for a storage matrix using the bistable devices of FIGURE 1, and FIGURE 3 shows an alternative form of the matrix shown in FIGURE 2.

A strip of magnetic film 1 (FIGURE 1) is deposited on a substrate 2 in the manner previously referred to. It will be appreciated that for the sake of clarity insulating layers which may be necessary are omitted and that the relative thicknesses of film and substrate are shown diagrammatically and are not intended to be regarded as true to scale.

An inner area 3 of the film 1 is the effective bistable element of the device and is used in consequence as the storage area for one storage element. A signal pick-up conductor 5 is closely linked with this area of the film. This conductor is in the form of a loop and may be formed by depositing firstly one half of the loop, using a mask having a suitable aperture. One end of this half is then protected by a mask while a first insulating layer, the ferromagnetic film area, and a second insulating layer are successively deposited. Finally the mask on the end of the first half of the loop is removed and the second half of the loop is deposited, the two halves thus being electrically connected at one end.

There are a pair of drive conductors 6 and 7. These are at right angles to the length of the strip 1 and each is linked with an outer area of film, one on each side of the area 3 of the film. These drive conductors may also be formed by deposition. In any case, they must be in close contact with the film. They must be relatively thin compared with their width, so that the longitudinal field due to the current in the strips is small.

The "easy" direction of magnetisation of the film is approximately along the length of the strip. If the easy direction lies at a small angle, say ten degrees, to the length of the strip, the switching time for some films may be less than if the easy direction is parallel to the long sides of the strip. The same effect may be obtained in other cases by application of a small bias field in the "hard" direction. It will be assumed that the strip 1 is initially magnetised to saturation with the left and right hand ends of the strip being north and south poles, respectively.

A current is now passed through the drive conductor 6 to produce a magnetic field which will tend to reverse the magnetic state of the outer area of film underneath the conductor. If this current is sufficiently large, the field will overcome the de-magnetising field created by the remainder of the film and the coercivity of the portion of the film underneath the conductor 6. The magnetic field acting on the film away from the conductor is substantially perpendicular to the film, since the conductor is relatively thin and is in close contact with the film. Thus the state of the area of film beneath the conductor 6 is reversed. This produces a north-north boundary at the edge of the inner area 3 adjacent to the conductor 6. This condition remains as long as the current flows in the drive conductor.

The effect of a suitable current in the conductor 6 is therefore to reverse the magnetic state of an outer area of the film adjacent to the inner area 3, without affecting that area. Since the outer area of the film beneath the conductor 6 is saturated, the actual value of the current in the conductor 6 is not critical provided it is sufficient to cause switching. However, the horizontal field due to the strip for very large currents may overcome the coercivity of the storage section, due to second order effects. Hence, these effects set a maximum value for the current.

A south-south boundary will be produced between the inner area 3 and the outer area beneath and switched by the conductor 7, if the current is passed through this conductor instead of the conductor 6.

If both outer areas are in the reversed state, the north-north and south-south boundaries of the storage section 3 start to move towards each other. This increases the field near the centre of the section so that the effect is cumulative and the magnetic state of the inner area is reversed rapidly. The two outer areas and the inner area are now all in the reversed state.

The switching of the inner area of the film is controlled by the magnetic states of the adjacent outer areas of the film and not directly by the currents in the drive conductors. The current in the drive conductors is not critical, provided that it is large enough to switch the outer area with which it is linked, since the current can have no further effect once the outer area has been switched.

The inner area 3 and the remainder of the film 1 may be deposited separately so that the two parts of the film may have different magnetic properties. For example, the inner area 3 may be of a different thickness or of a different composition. In this way, the switching time, for example, of the inner area may be improved over the use of a uniform film, without altering the characteristics of the outer area.

It will be appreciated that a number of conditions must be satisfied for the bistable device to operate:

(1) the film must have intrinsically a substantially rectangular hysteresis loop in the direction of magnetisation in order to provide the required stability in the two states:

(2) the dimensions of the inner area must be such that it is not switched by the switching of either outer area alone, and is switched when both outer areas are reversed.

The properties of the film are dependent upon the composition, the method of deposition and the thickness.

The pick-up conductor 5 is linked only with the inner area 3 of the film and consequently detects changes of magnetic state in this section only. Hence the stored information may be read out by any convenient method of switching the inner area back to the initial state. For example, the inner area may be caused to switch back by applying resetting currents in the opposite direction to the drive conductors to return the outer areas to the initial state. In another case a form of non-destructive read out may alternatively be used. This involves switching the inner area only towards the initial state by the application of current to a suitably positioned read out conductor. If both the outer areas are in the reversed state, they will return the inner area to the reversed state when the current in the read out conductor ceases.

A number of the storage elements may be arranged on a common substrate to provide a multi-element storage device, each storage element consisting of a separate bistable device as described above. One such arrangement is shown in FIGURE 2. The storage elements are arranged in the rows and columns of a matrix and a separate area 1 of magnetic film is provided for each bistable device.

The drive conductors for each column consist of a straight conductor 10, corresponding to the conductor 7 of FIGURE 1. Each row conductor 9 is of zig-zag form so that it is closely coupled only to the required portion of each storage element. Thus the portion of the conductor 9 overlying an area 1 of the film corresponds to the conductor 6 of the FIGURE 1.

The conductors 9 are connected to a selection network 11 arranged to select one row conductor 9 in the usual manner. The column conductors 10 are also connected to a selection network 12. It will be appreciated that because the conductors 9 are arranged in zig-zag formation the drive currents applied to alternate ones of the conductors 10 are required to be reversed, so that both row and column drive currents applied to any one of the elements are in the same direction. Thus, the selection network 12 is arranged to supply currents of opposite polarities to alternate conductors 10. Since the reading out of a stored item may be accomplished by reversing the setting of the outer areas of an element, both selection networks 11 and 12 are arranged so that currents of opposite polarities may be supplied to any of the conductors 9 and 10 in dependence upon whether information is to be entered into or read from the matrix. The selection of a particular element for either entry or reading of information is performed by selecting particular row and column conductors 9 and 10 to be supplied with current of a predetermined polarity in the same manner as for a conventional matrix. However, because the principal requirement for each of the switching currents is that their amplitude is great enough to cause switching of the outer areas of the selected element, the tolerances on drive and resetting currents is much greater than for a conventional matrix. The loops 5 may be connected in series in conventional manner for the purpose of reading out stored items of information.

The matrix shown in FIGURE 2 has a separate area of film for each of the storage elements. An alternative form of construction for a matrix of this kind is shown in FIGURE 3, in which the substrate 2 carries a continuous ferromagnetic film 1. The drive conductors 9 and 10 and the pick-up conductors 5 are formed in the manner described for FIGURE 2. In this case each area of the film 1 falling within the parallel boundaries defined by parallel parts of conductors 9 and 10 forms a single element. These elements are spaced apart by a distance D which is arranged to be sufficiently great to prevent mutual interference between adjacent elements.

In the foregoing description the bistable devices have been described as information storage devices particularly suitable for use in electronic data processing apparatus. It will be appreciated however that such devices are also suitable for use as logical switching elements. For example, the simple element as shown in FIGURE 1 may be used as an AND gate, two input signals being applied as drive currents to the conductors 6 and 7 and an output signal being obtained from the pick-up conductor 5 only if both inputs are present concurrently.

Alternatively the device may be arranged so that a single outer area that has been switched is not restored by the effects of the unswitched inner area. This may be arranged by the appropriate choice of the size and composition of the outer area with respect to the inner area, the outer areas having two stable states. Under these circumstances the inner area is switched upon the occurrence of the latter of the two input signals and an output signal may be derived at this time to indicate that the two input signals have occurred. In practice the outer areas may be reset at predetermined times so that an output signal signifies the occurrence of at least one input signal to each of the outer areas since the last previous resetting operation.

In a further modification a logical AND NOT gate may be arranged by the application of a current to a conductor linked with the inner area to switch the inner area to a set state. This setting current is applied to the conductor at predetermined sampling times, and the application of a setting current is followed by the application of a resetting current in the reverse direction. Hence, an output signal is derived upon the application of the setting current only if the inner area has not already been switched in response to input signals on the conductors linked with the outer areas since the last previous sampling time. Thus, the output signal signifies that at least one input signal has not occurred.

An OR gate may be formed by using a number of bistable elements whose output conductors are connected together and each having one outer area maintained in a set condition by the application of current to one outer area conductor. Thus, the application of an input signal to any one of the other inputs causes switching of one element and the consequent generation of an output signal.

Alternatively, instead of maintaining one input to each element permanently energized, the required one input signal may be applied to each of the elements at a series of sampling times and in this case an output signal occurring at a sampling time signifies that at least one other input has occurred since the last previous sampling time.

What we claim is:

1. A bistable device including a pair of spaced apart areas of thin ferromagnetic film lying in the same plane, each area being effective when magnetised to produce a magnetic field in the space between the areas; means for driving each of said spaced apart areas independently to a selected one of two opposite states of magnetic saturation; a magnetic element comprising an area of thin ferromagnetic film having two opposite states of magnetic remanence positioned between said spaced apart areas and linked with the magnetic fields produced by both spaced apart areas, said magnetic fields being effective to switch said magnetic element to a corresponding remanent state from the opposite remanent state only if both areas are concurrently in like states of saturation and the magnetic fields being ineffective to switch said magnetic element if said spaced apart areas are concurrently in unlike states of saturation; and means coupled to said magnetic element and responsive to switching of the magnetic element to produce an output signal.

2. A bistable device including a pair of spaced apart areas of thin ferromagnetic film lying in the same plane, each area being settable to either of two opposite remanent magnetic states and effective when set to produce a corresponding magnetic field in the space between the areas; means for selectively setting each of said spaced apart areas independently to one of said remanent magnetic states; a magnetic element comprising an area of thin ferromagnetic film having two opposite states of magnetic remanence positioned between said spaced apart areas and linked with the magnetic fields produced by both spaced apart areas, said magnetic fields being effective to switch said magnetic element to a corresponding remanent state from the opposite state only if both areas are concurrently in like remanent states and the magnetic fields being ineffective to switch said magnetic element if said spaced apart areas are concurrently in unlike remanent states; and means coupled to said magnetic element and responsive to switching of the magnetic element to produce an output signal.

3. A bistable device including first and second spaced apart areas of thin ferromagnetic film lying in a common plane, each area being settable to either of two opposite magnetic states and effective when set to produce a corresponding magnetic field in the space between the areas; a first driving conductor linked with said first area; a second driving conductor linked with said second areas; means for applying a driving current selectively and independently to each of said first and second driving conductors to set said first and second areas respectively each to one of said opposite magnetic states; a third area of thin ferromagnetic film having two opposite stable states of magnetic remanence lying in said common plane between said first and second areas and linked with the magnetic fields produced by both said first and second areas, said magnetic fields being effective to switch said third area to a corresponding remanent state from the opposite remanent state only if both said first and second areas are concurrently in like magnetic states and being ineffective to switch said third area if said first and second areas are concurrently in unlike magnetic states; and a pick-up conductor linked with said third area, an output signal being induced in said pick-up conductor in response to switching of said third area.

4. A bistable device including first and second spaced apart areas of thin ferromagnetic film lying in a common plane, each area being switchable between first and second opposite magnetic stable states and being effective when in each of said states to produce a corresponding magnetic field in the space between the areas, both areas being initially in said first stable state; a first driving conductor linked with said first area; a second driving conductor linked with said second area; means for applying a setting current selectively and independently to each of said first and second driving conductors to switch said first and second areas from said first to said second stable state; a third area of thin ferromagnetic film having corresponding first and second stable magnetic states lying in said common plane between said first and second areas and linked with the magnetic fields produced by both said first and second areas, said magnetic fields being effective to switch said third area to a corresponding remanent state from the opposite remanent state only if both said first and second areas are concurrently in like magnetic states and being ineffective to switch said third area if said first and second areas are concurrently in unlike magnetic states; a pick-up conductor linked with said third area, an output signal being induced in said pick-up conductor in response to switching of said third area from said first to said second state and means for applying a resetting current concurrently to said first and second drive conductors to restore the areas to said first state.

5. A plurality of bistable devices utilizing thin ferromagnetic film supported on a common substrate, each device including first and second spaced apart areas of film, each area being settable to either of two opposite magnetic states and effective when set to produce a corresponding magnetic field in the space between the areas; a first driving conductor linked with said first area; a second driving conductor linked with said second area; means for applying a driving current selectively and independently to each of said first and second driving conductors to set said first and second areas respectively each to one of said opposite magnetic states; a third area of film having two opposite stable states of magnetic remanence positioned between said first and second areas and linked with the magnetic fields produced by both said first and second areas, said magnetic fields being effective to switch said third area to a corresponding remanent state from the opposite remanent state only if both said first and second areas are concurrently in like magnetic states and being ineffective to switch said third area if said first and second areas are concurrently in unlike magnetic states; and a pick-up conductor linked with said third area, an output signal being induced in said pick-up conductor in response to switching of said third area.

6. A plurality of bistable devices utilizing a thin ferromagnetic film having two opposite stable states of magnetic remanence supported on a substrate, each device including first and second discrete areas of the film spaced apart on the substrate and each effective when in either of said stable states to produce a corresponding magnetic field in the space between the areas; a first driving conductor linked with said first area; a second driving conductor linked with said second area; means for applying a driving current selectively and independently to each of said first and second driving conductors to set said first and second areas of film respectively each to one of said opposite remanent states; a third area of film comprising that area lying between said first and second areas and linked with the magnetic fields produced by both said first and second areas, said magnetic fields being effective to switch said third area to the corresponding remanent state from the opposite remanent state only if both said first and second areas are concurrently in like remanent states and being ineffective to switch said third area if said first and second areas are in unlike remanent states; and a pick-up conductor linked with said third area, an output signal being induced in said pick-up conductor in response to switching of said third area.

7. Information storage apparatus including a plurality of bistable devices utilizing thin ferromagnetic film arranged in rows and columns on a common substrate, each device including first and second spaced apart areas of film each settable to a second from a first opposite magnetic state to produce a corresponding magnetic field in the space between the areas; a row driving conductor for each row linked with said first areas of all the devices in the row; a column driving conductor for each column linked with said second areas of all the devices in the column; means for applying a driving current to the row conductor of a selected row and to the column conductor of a selected column to set the first and second areas respectively linked therewith from said first to said second magnetic state, both said first and second areas of only one device lying in the selected row and column being set concurrently to said second magnetic state; a third area of film for each device having two opposite states of magnetic remanence lying in the space between said first and second areas of the device and linked with the magnetic fields produced by both areas, said fields being effective to switch said third area of the device to a corresponding remanent state from the opposite remanent state only if both said first and second areas of the device are concurrently in like magnetic states and being ineffective to switch said third area of the device if said first and second areas of the device are in unlike magnetic states; and a pick-up conductor linked with said third area of each device, an output signal being induced in that pick-up conductor of said one device in response to the switching of the third area linked therewith.

8. Information storage apparatus including a plurality of bistable devices utilizing thin ferromagnetic films arranged in rows and columns on a common substrate, each device including first and second spaced apart areas of film each settable from a first to a second opposite magnetic state to produce a corresponding magnetic field in the space between the areas; a row driving conductor for each row linked with said first areas of all the devices in the row; a column driving conductor for each column linked with said second areas of all the devices in the column; means for applying a driving current to selected row and column conductors to set the first and second areas respectively linked therewith from said first to said second magnetic state, the first and second areas of a device lying in a selected row and a selected column both being concurrently set to said second magnetic state; a third area of film for each device having two opposite stable states of magnetic remanence corresponding respectively to said first and second magnetic states of said first and second areas lying in the space between the first and second areas of the device and linked with the magnetic fields produced by both areas, said fields being effective to switch said third area of the device to the corresponding remanent state from the opposite remanent state only if both said first and second areas of the device are concurrently in like magnetic states and being ineffective to switch said third area of the device if said first and second areas of the device are concurrently in unlike magnetic states; a pick-up conductor for each device linked with said third area of the device, an output signal being induced in the pick-up conductor of a selected device in response to the switching of the third area linked therewith and means for applying a resetting current to said selected row and column conductor to restore the areas linked therewith to said first state.

References Cited in the file of this patent

UNITED STATES PATENTS 2,919,432 Broadbent ------------- Dec. 29, 1959